(12) United States Patent
Ye

(10) Patent No.: US 12,297,632 B2
(45) Date of Patent: May 13, 2025

(54) ANTI-SCALD DEVICE

(71) Applicant: AS America, Inc., Piscataway, NJ (US)

(72) Inventor: Xiao Jing Ye, Edison, NJ (US)

(73) Assignee: AS America, Inc., Piscataway, NJ (US)

( * ) Notice: Subject to any disclaimer, the term of this patent is extended or adjusted under 35 U.S.C. 154(b) by 226 days.

(21) Appl. No.: 18/076,156

(22) Filed: Dec. 6, 2022

(65) Prior Publication Data

US 2023/0183954 A1 Jun. 15, 2023

Related U.S. Application Data

(60) Provisional application No. 63/288,923, filed on Dec. 13, 2021.

(51) Int. Cl.
*E03C 1/04* (2006.01)
*E03C 1/02* (2006.01)
*F16K 31/00* (2006.01)

(52) U.S. Cl.
CPC ............ *E03C 1/041* (2013.01); *F16K 31/002* (2013.01); *E03C 2001/026* (2013.01)

(58) Field of Classification Search
CPC ... E03C 1/041; E03C 2001/026; F16K 31/002
USPC ......... 4/668, 378, 541.2, 623, 671, 675, 679
See application file for complete search history.

(56) References Cited

U.S. PATENT DOCUMENTS

| | | | | |
|---|---|---|---|---|
| 5,161,737 A | * | 11/1992 | Olmsted | G05D 23/136 236/12.21 |
| 5,341,987 A | * | 8/1994 | Ackroyd | G05D 23/136 236/12.21 |
| 5,878,949 A | | 3/1999 | Matsui | |
| 8,522,814 B2 | | 9/2013 | Kempf | |
| 11,573,581 B2 | * | 2/2023 | Wilson | E03C 1/0404 |
| 2007/0012792 A1 | | 1/2007 | Iwai | |
| 2007/0075152 A1 | | 4/2007 | Guterman | |
| 2007/0290058 A1 | | 12/2007 | Guterman | |

(Continued)

FOREIGN PATENT DOCUMENTS

| | | | | |
|---|---|---|---|---|
| CA | 2690361 A1 | * | 7/2011 | ............ F16K 11/044 |
| CN | 101035954 A | * | 9/2007 | ............. E03C 1/041 |

(Continued)

OTHER PUBLICATIONS

Torres et al., Office Action dated Nov. 29, 2024, directed to U.S. Appl. No. 18/076,153; 8 pages.

*Primary Examiner* — Lori L Baker
(74) *Attorney, Agent, or Firm* — Morrison & Foerster LLP

(57) ABSTRACT

An anti-scald device can include a housing having a cylindrical interior space including a first cavity, a second cavity, a mixing chamber, a hot water inlet, and a cold water inlet, a plunger provided within the cylindrical interior space and including a cylindrical protrusion portion that separates the first cavity from the second cavity, a spring in the first cavity, and a wax element in the second cavity. The anti-scald device is in an inactive configuration when the temperature of the mixed water is below a threshold temperature, and when the mixed water reaches or exceeds a threshold temperature and comes in contact with the wax element, the wax element is configured to expand to reduce or restrict hot water flow such that the anti-scald is in a partially active or a fully active configuration.

20 Claims, 6 Drawing Sheets

(56) References Cited

U.S. PATENT DOCUMENTS

| | | | | |
|---|---|---|---|---|
| 2009/0007975 A1* | 1/2009 | Lum | ............ | E03B 7/04 |
| | | | | 137/597 |
| 2010/0314457 A1 | 12/2010 | Todaka et al. | | |
| 2011/0168927 A1* | 7/2011 | Yuan | ............ | F16K 11/044 |
| | | | | 251/11 |
| 2013/0220439 A1 | 8/2013 | Pitsch et al. | | |
| 2013/0248005 A1 | 9/2013 | Pitsch et al. | | |
| 2017/0145670 A1 | 5/2017 | Leinen | | |
| 2017/0252755 A1 | 9/2017 | Pitsch et al. | | |
| 2017/0328041 A1* | 11/2017 | Seggio | ............ | E03C 1/0412 |
| 2018/0245320 A1 | 8/2018 | Pitsch | | |
| 2021/0191432 A1* | 6/2021 | Wilson | ............ | E03C 1/0404 |
| 2023/0183953 A1 | 6/2023 | Torres | | |
| 2024/0209603 A1* | 6/2024 | Li | ............ | G05D 23/134 |

FOREIGN PATENT DOCUMENTS

| | | | | |
|---|---|---|---|---|
| CN | 101178128 B | * | 12/2010 | |
| EP | 1376292 B1 | * | 12/2005 | ......... G05D 23/1353 |
| EP | 2354880 A1 | * | 8/2011 | ............ F16K 11/044 |
| FR | 3044782 A1 | * | 6/2017 | ......... G05D 23/1353 |
| WO | WO-2004027295 A2 | * | 4/2004 | ......... G05D 23/1313 |

\* cited by examiner

ANTI-SCALD DEVICE

CROSS-REFERENCE TO RELATED APPLICATIONS

This application claims the benefit of U.S. Provisional Application No. 63/288,923, filed Dec. 13, 2021, the entire contents of which is incorporated herein by reference.

FIELD

The present disclosure generally relates to faucet assemblies, and more particularly, to faucet assemblies having anti-scald devices.

BACKGROUND

Conventional faucet assemblies do not have any control for preventing unsafe hot water temperatures being delivered to a user of the faucet assembly. Thus, a user of a conventional faucet assembly may, when manipulating a temperature control of the faucet assembly (e.g., a handle or knob) to receive hot water, may receive excessively hot water. Excessively hot water can cause a scald injury to the user.

Accordingly, anti-scald devices may be connected to a conventional faucet to control the maximum temperature of the water flowing out of and to the user. Anti-scald devices are generally after-market devices that can connect to a faucet assembly and can reduce or stop the flow of water when the mixed water temperature exceed a certain threshold. For example, it may be desired for plumbing fixtures that are used predominantly by children or elderly people to have an anti-scald device to prevent injuries. A user can install an anti-scald device to control the water temperature of their faucet assembly.

SUMMARY

Provided herein are faucet assemblies having anti-scald devices. The anti-scald devices of the faucet assemblies described include a temperature-sensitive wax element, a plunger, and a spring. Specifically, the anti-scald devices described include a temperature-sensitive wax element that, when exposed to water having a temperature that is at or above a threshold temperature, expands. The expansion of the wax element pushes the plunger within the anti-scald device, causing the plunger to block a hot water inlet of the anti-scald device, restricting hot water flow into the anti-scald device. This reduced (or complete lack of) hot water flow allows the temperature of the mixed water to drop below the threshold temperature (since cold water will predominately be flowing to the mixing chamber of the anti-scald device), allowing the wax element to contract and return to its original position (along with the plunger).

The anti-scald devices are configured to receive hot and cold water that combine at a mixing chamber. The hot water inlet and cold water inlets may be located on opposite ends of the anti-scald device. The hot water may enter a hot water inlet and flow into a cavity within the anti-scald device that houses a spring. In some embodiments, the spring may be coiled around the shaft of a plunger. From the cavity, the hot water may flow into a mixing chamber. The cold water may flow into a cold water inlet and straight into the mixing chamber, where it mixes with the hot water to form mixed water. From the mixing chamber, the mixed water flows into a second cavity of the anti-scald device which houses the wax element, coming in contact with the wax element. From this second cavity, the mixed water can exit the anti-scald device through an outlet.

In some embodiments, when the temperature of the mixed water reaches or exceeds a threshold temperature, the wax element expands. This expansion can cause the plunger to move laterally within the anti-scald device, causing the flow path of hot water from the hot water inlet to the cavity housing the spring to be restricted. This lateral motion of the plunger also causes the spring to compress. When the hot water flow is restricted (partially or completely), the temperature of the mixed water is allowed to decrease, due to the higher proportion of cold water flowing into the mixing chamber (compared to hot water). When the temperature of the mixed water decreases below the threshold temperature, the wax element contracts back to its original size and shape and position. When the wax element returns to its original size and shape and position, the compressed spring can also expand back to its original shape and push the plunger back to its original position (such that the hot water flow path is reopened).

Accordingly, the faucet assemblies provided herein include a wax element configured to respond to mixed water temperatures that are at or above a threshold temperature. In some embodiments, the threshold temperature of the faucet assembly is a temperature at which scalding injuries may begin to occur. Thus, the anti-scald device of the faucet assemblies described herein is designed to maintain a dispensed water temperature (i.e., water that is dispensed from the faucet assembly) below the threshold temperature to prevent scalding injuries.

In some embodiments, provided is an anti-scald device for a faucet assembly, the anti-scald device comprising: a housing having a cylindrical interior space comprising a first cavity, a second cavity, a mixing chamber, a hot water inlet, and a cold water inlet; a plunger provided within the cylindrical interior space of the housing and comprising a shaft portion and a cylindrical protrusion portion, wherein an outer cylindrical surface of the cylindrical protrusion portion is in contact with an interior surface of the housing, and the cylindrical protrusion portion separates the first cavity from the second cavity of the housing; a spring provided within the first cavity and coiled around the shaft portion of the plunger; and a wax element provided within the second cavity, wherein the mixing chamber is configured to receive hot water from the hot water inlet and cold water from the cold water inlet to form mixed water, and the second cavity is configured to receive the mixed water from the mixing chamber, and wherein the anti-scald device is in an inactive configuration when the temperature of the mixed water is below a threshold temperature, and when the mixed water reaches or exceeds a threshold temperature and comes in contact with the wax element, the wax element is configured to expand, causing the plunger to move laterally within the housing to compress the spring and reduce or restrict hot water flow into the mixing chamber such that the anti-scald is in a partially active or a fully active configuration.

In some embodiments of the anti-scald device, the wax element comprises paraffin wax.

In some embodiments of the anti-scald device, the threshold temperature is 115-125° F.

In some embodiments of the anti-scald device, when the anti-scald device is in the inactive configuration, the wax element is fully contracted and the spring is fully expanded.

In some embodiments of the anti-scald device, the shaft portion of the plunger comprises a proximal end adjacent to the cylindrical protrusion portion and a distal end, and when the anti-scald device transitions from the inactive configuration to the fully active configuration, the plunger moves laterally such that an outer surface of the distal end of the shaft portion of the plunger comes in contact with an interior surface of the hot water inlet, preventing flow of hot water through the hot water inlet and into the first cavity.

In some embodiments of the anti-scald device, when the anti-scald device is in the fully active configuration, an outer surface of the cylindrical circumferential portion of the plunger covers an opening of a waterway fluidly connecting the hot water inlet and the mixing chamber, preventing flow of hot water through the opening.

In some embodiments of the anti-scald device, when the anti-scald device is in the fully active configuration, an outer surface of a distal end of the shaft portion of the plunger closes the hot water inlet, preventing flow of hot water through the hot water inlet and into the first cavity.

In some embodiments of the anti-scald device, the anti-scald device comprises an outlet configured to receive mixed water from the second cavity, wherein a flow path of the outlet is perpendicular to a direction of lateral movement of the plunger.

In some embodiments of the anti-scald device, the mixing chamber is formed by the housing and a cover plate.

In some embodiments of the anti-scald device, the hot water inlet comprises an adaptor coupled to the housing.

In some embodiments, provided is a faucet assembly comprising an anti-scald device, the faucet assembly comprising: a faucet body; two handle members, a first handle member configured to control flow of hot water from a hot water source to the faucet body and a second handle member configured to control flow of cold water from a cold water source to the faucet body; and an anti-scald device fluidly coupled to each of the two handle members and the faucet body, the anti-scald device comprising: a housing having a cylindrical interior space comprising a first cavity, a second cavity, a mixing chamber, a hot water inlet in fluid communication with the first handle member, and a cold water inlet in fluid communication with the second handle member; a plunger provided within the cylindrical interior space of the housing and comprising a shaft portion and a cylindrical protrusion portion, wherein an outer cylindrical surface of the cylindrical protrusion portion is in contact with an interior surface of the housing, and the cylindrical protrusion portion separates the first cavity from the second cavity of the housing; a spring provided within the first cavity and coiled around the shaft portion of the plunger; and a wax element provided within the second cavity, wherein the mixing chamber is configured to receive hot water from the hot water inlet and cold water from the cold water inlet to form mixed water, and the second cavity is configured to receive the mixed water from the mixing chamber, and wherein the anti-scald device is in an inactive configuration when the temperature of the mixed water is below a threshold temperature, and when the mixed water reaches or exceeds a threshold temperature and comes in contact with the wax element, the wax element is configured to expand, causing the plunger to move laterally within the housing to compress the spring and reduce or restrict hot water flow into the mixing chamber such that the anti-scald is in a partially active or a fully active configuration.

In some embodiments of a faucet assembly comprising an anti-scald device, the wax element comprises paraffin wax.

In some embodiments of a faucet assembly comprising an anti-scald device, the threshold temperature is 115-125° F.

In some embodiments of a faucet assembly comprising an anti-scald device, when the anti-scald device is in the inactive configuration, the wax element is fully contracted and the spring is fully expanded.

In some embodiments of a faucet assembly comprising an anti-scald device, the shaft portion of the plunger comprises a proximal end adjacent to the cylindrical protrusion portion and a distal end, and when the anti-scald device transitions from the inactive configuration to the fully active configuration, the plunger moves laterally such that an outer surface of the distal end of the shaft portion of the plunger comes in contact with an interior surface of the hot water inlet preventing flow of hot water through the hot water inlet and into the first cavity.

In some embodiments of a faucet assembly comprising an anti-scald device, when the anti-scald device is in the fully active configuration, an outer surface of the cylindrical circumferential portion of the plunger covers an opening of a waterway fluidly connecting the hot water inlet and the mixing chamber, preventing flow of hot water through the opening.

In some embodiments of a faucet assembly comprising an anti-scald device, when the anti-scald device transitions from the fully active configuration to the inactive configuration due to the temperature of the mixed water decreasing below the threshold temperature, the spring returns to its expanded configuration.

In some embodiments of a faucet assembly comprising an anti-scald device, the anti-scald device comprises an outlet configured to receive mixed water from the second cavity, wherein a flow path of the outlet is perpendicular to a direction of lateral movement of the plunger.

In some embodiments of a faucet assembly comprising an anti-scald device, the mixing chamber is formed by the housing and a cover plate.

In some embodiments of a faucet assembly comprising an anti-scald device, the hot water inlet comprises an adaptor coupled to the housing.

In some embodiments, any one or more of the features, characteristics, or elements discussed above with respect to any of the embodiments may be incorporated into any of the other embodiments mentioned above or described elsewhere herein.

DETAILED DESCRIPTION

Figure 1:
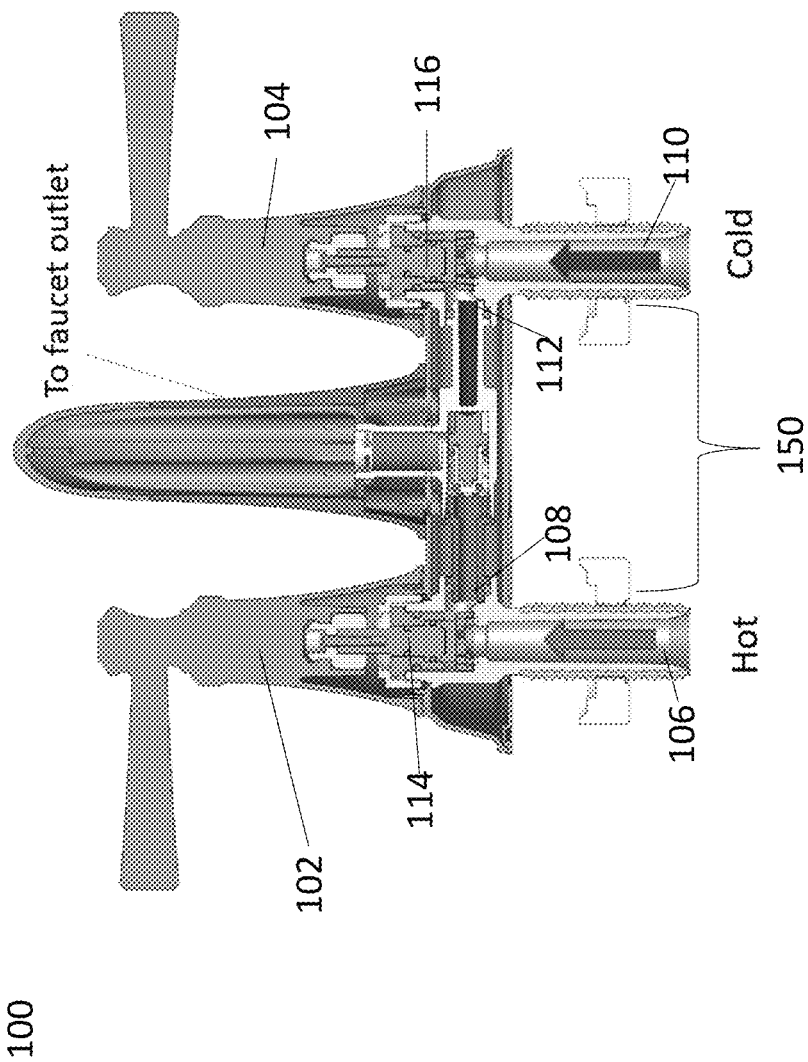
FIG. 1 shows a cross-sectional view of a faucet assembly comprising an anti-scald device having a wax element, according to some embodiments.

Described herein are faucet assemblies including anti-scald devices having a temperature-sensitive wax element.

The temperature-sensitive wax element of the anti-scald devices can expand when the temperature of the mixed water within a faucet assembly reaches or exceeds a threshold temperature. The expansion of the wax element can cause lateral movement of a plunger within an internal space of the anti-scald device such that the plunger either partially or completely restricts the flow of hot water into the anti-scald device and/or to the mixing chamber of the faucet assembly. By partially or completely restricting the water flow of hot water into the anti-scald device and/or to the mixing chamber of the faucet assembly, the temperature of the mixed water decreases such that it drops below the threshold temperature. Thus, the anti-scald devices comprising a wax element of the faucet assemblies described herein can prevent scald injuries by automatically adjusting the flow of hot water when necessary (i.e., when the mixed water temperature gets too high).

After activating (i.e., adjusting the flow of hot water in response to a high mixed water temperature), the anti-scald device can reset or return to its original, open position. To reset the anti-scald device, the temperature of the mixed water must decrease below the threshold temperature. This can occur when the hot water flow is restricted, allowing only (or predominantly) cold water to enter the faucet assembly and mixing chamber. When the temperature of the mixed water decreases, the wax element contracts and returns to its original size and shape (i.e., not an expanded size and shape). In some embodiments, a counter spring may provide a force on the wax element, helping to return the wax element to its original size, shape, and position. This original size, shape, and position is also referred to herein as an "open" or "inactive" position, since the hot water inlet waterway is completely open when the wax element is in this position, and the anti-scald device is inactive.

In some embodiments, the faucet assemblies described are centerset faucet assemblies, or widespread dual handle faucet assemblies. In some embodiments, the faucet assemblies described are single-handle faucet assemblies.

Referring now to the drawings, like parts are marked throughout the specification and drawings with the same reference numerals, respectively.

FIG. 1 shows a cross-sectional view of a faucet assembly 100 including an anti-scald device 150 comprising a wax element, according to some embodiments.

As shown in FIG. 1, the anti-scald device 150 is positioned horizontally between a first handle 102 and a second handle 104. The first handle 102 controls in the flow of hot water from a hot water source 106 to a hot water inlet 108 of the anti-scald device 150. Similarly second handle 104 controls the flow of cold water from a cold water source 110 to a cold water inlet 112 of anti-scald device 150. Specifically, each of the first handle 102 and the second handle 104 controls a cartridge (i.e., 114 and 116, respectively), which controls the flow of water through said cartridge and to the anti-scald device 150. Anti-scald device 150 is described in more detail below.

Figure 2A:
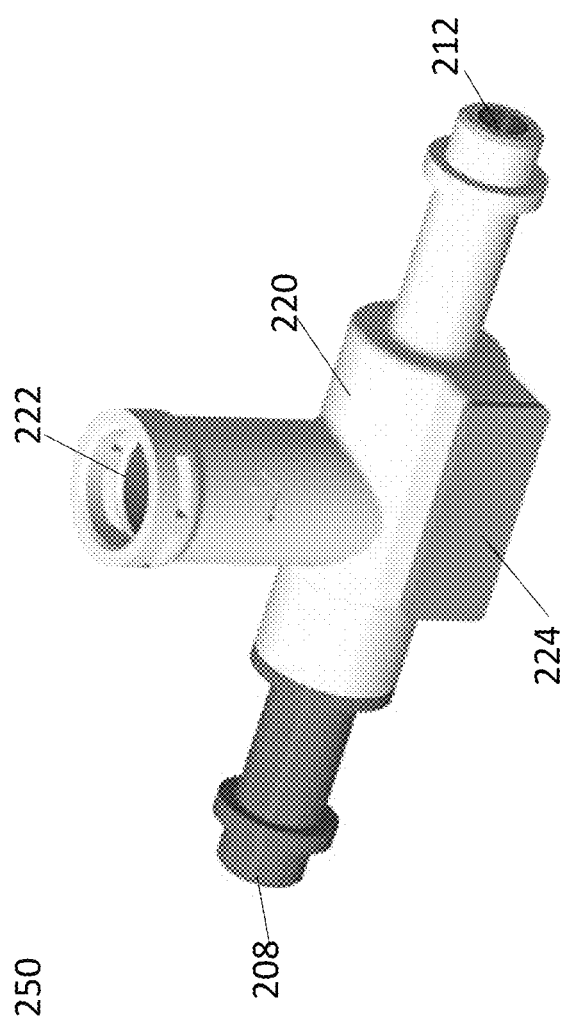
FIG. 2A shows a perspective view of an anti-scald device, according to some embodiments.

FIG. 2A shows a perspective view of an anti-scald device 250, according to some embodiments. As shown, the anti-scald device 250 of FIG. 2A includes a housing 220, a hot water inlet 208, a cold water inlet 212, and a mixed water outlet 222. Also shown is a cover plate 224. In some embodiments, cover plate 224 defines a mixing chamber, along with housing 220.

In some embodiments, housing 220 may comprise a thermoplastic, for example an engineering thermoplastic, for example polyphenylene sulfide. Housing 220 may be injection molded. In some embodiments, cover plate 224 may comprise vinyl or polyphenylene sulfide. In some embodiments, cover plate 224 may be injection molded or extruded.

Figure 2B:
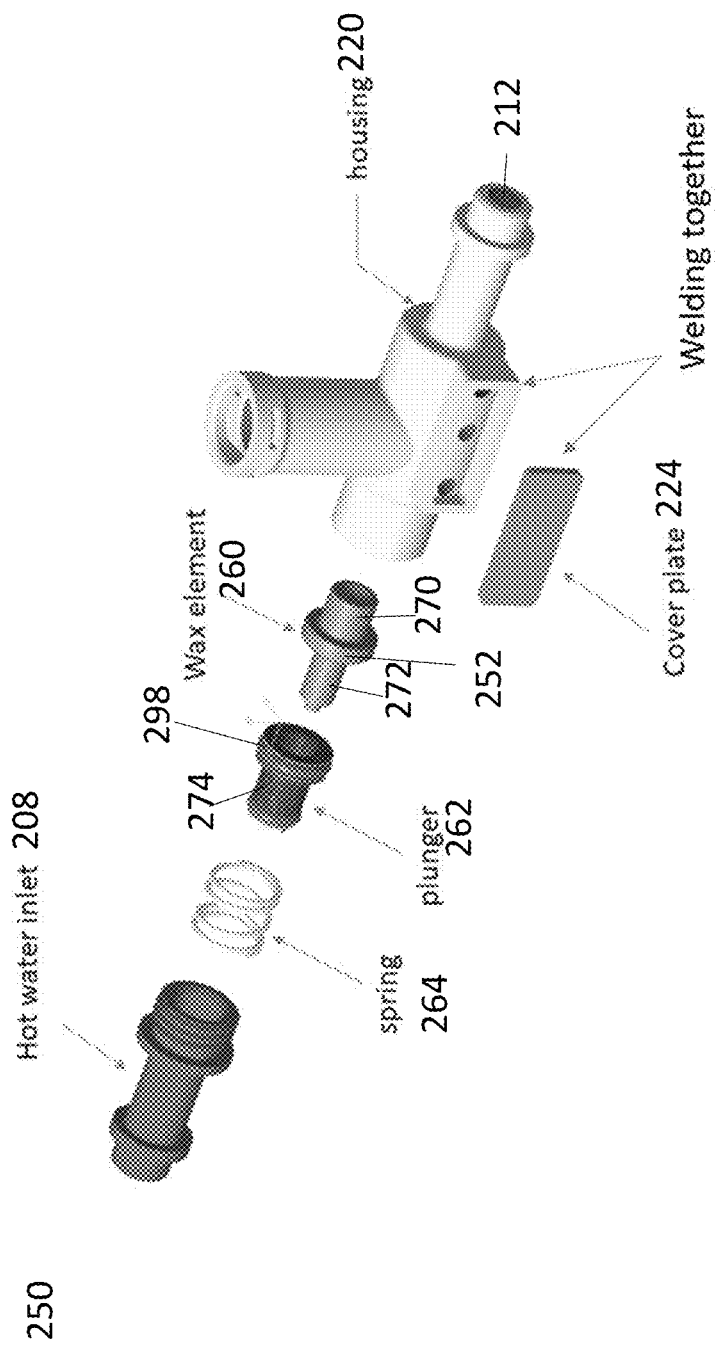
FIG. 2B shows an exploded view of an anti-scald device having a wax element, according to some embodiments.

FIG. 2B shows an exploded view of an anti-scald device 250 having a wax element 260, according to some embodiments. Specifically, the anti-scald device 250 of FIG. 2B includes housing 220, cover plate 224, wax element 260, plunger 262, spring 264, hot water inlet, and cold water inlet 212.

As shown, hot water inlet 208 can comprise a component separate from housing 220. For example, the separate component comprising hot water inlet 208 can comprise an adaptor piece configured to couple to housing 220. In some embodiments, adaptor piece of hot water inlet 208 may couple to housing 220 using threads, a snap fit, or the like. In some embodiments, the coupling between the adaptor piece and housing 220 may form a water tight coupling.

Wax element 260 may be made of paraffin wax. In some embodiments, wax element 260 comprises a brass housing. In some embodiments, wax element 260 comprises a head portion 270 and a shaft portion 272. Shaft portion 272 may be configured to slide into an opening within plunger 262. Further, shaft portion 274 of plunger 262 comprises a proximal end located adjacent to a head portion of plunger 262, and a distal end located proximate to hot water inlet 208. When wax element 260 expands due to the temperature of the mixed water reaching or exceeding a threshold temperature, the expansion of wax element 260 can cause the plunger to slide laterally within housing 220 towards spring 264. When this lateral motion occurs, spring 264 is compressed, and the distal end of shaft portion 274 of plunger 262 may come in contact with an interior surface of hot water inlet 208. When the distal end of the shaft portion 274 of plunger 262 comes in contact with an interior surface of hot water inlet 208, the flow of hot water into anti-scald device 250 is restricted. Specifically, hot water is prevented (or partially restricted) from flowing though hot water inlet 208 and to an interior cavity of housing 220.

Note that plunger 262 and wax element 260 are configured to fit within a cavity of housing 220 such that an exterior surface of each of the plunger 262 and wax element 260 comes into direct contact with an interior surface of the cavity of housing 220. In some embodiments, plunger 262 includes a head portion. The head portion can include a circumferential protrusion 298 having an exterior circumferential surface that faces an interior surface of the cavity of housing 220. In some embodiments, this exterior circumferential surface comes in contact with the interior surface of the cavity of housing 220. In some embodiments, the exterior circumferential surface of the circumferential protrusion 298 of the head portion of plunger 262 creates a watertight seal with the interior surface of cavity of housing 220.

Similarly, wax element 260 may also comprise a head portion 270. Head portion 270 can include a circumferential protrusion 252 that includes an exterior circumferential surface that faces an interior surface of the cavity of housing 220. In some embodiments, the exterior circumferential surface comes in contact with the interior surface of the cavity of housing 220. In some embodiments, the exterior circumferential surface of the circumferential protrusion 252 of the head portion 270 of the wax element 260 forms a watertight seal with the interior surface of the housing 220.

In some embodiments, plunger 262 may having a total length of about 5-25 mm or about 10-20 mm. In some embodiments, plunger 262 may have a total length less than or equal to about 25, about 20, about 15, or about 10 mm. In some embodiments, plunger 262 may have a total length greater than or equal to about 5, about 10, about 15, or about 20 mm. In some embodiments, plunger 262 may have a maximum circumference of about 5-20 mm or about 5-15 mm. In some embodiments, plunger 262 may have a maximum circumference of less than or equal to about 20, about 15, or about 10 mm. In some embodiments, plunger 262 may have a maximum circumference of greater than or equal to about 5, about 10, or about 15 mm.

In some embodiments, wax element 260 may have a total length of about 5-30 mm or about 15-20 mm. In some embodiments wax element 260 may have a total length of less than or equal to about 30, about 25, about 20, about 15, or about 10 mm. In some embodiments, wax element 260 may have a total length of greater than or equal to about 5, about 10, about 15, about 20, or about 25 mm. In some embodiments, wax element 260 may have a maximum circumference of about 5-20 mm or about 10-15 mm. In some embodiments, wax element 260 may have a maximum circumference of less than or equal to about 20, about 15, or about 10 mm. In some embodiments, wax element 260 may have a maximum circumference of greater than or equal to about 5, about 10, or about 15 mm.

In some embodiments, spring 264 may have an outer circumference of about 5-25 or about 10-15 mm. In some embodiments, spring 264 may have an outer circumference of less than or equal to about 25, about 20, about 15, or about 10 mm. In some embodiments, spring 264 may have an outer circumference of greater than or equal to about 5, about 10, about 15, or about 20 mm. In some embodiments, spring 264 may comprise wire having a thickness of about 0.5-3 or 0.5-1 mm. In some embodiments, spring 264 may comprise wire having a thickness of less than or equal to about 3, about 2.5, about 2, about 1.5, or about 1 mm. In some embodiments, spring 264 may comprise wire having a thickness of greater than or equal to about 0.5, about 1, about 1.5, about 2, or about 2.5 mm.

Figure 2C:
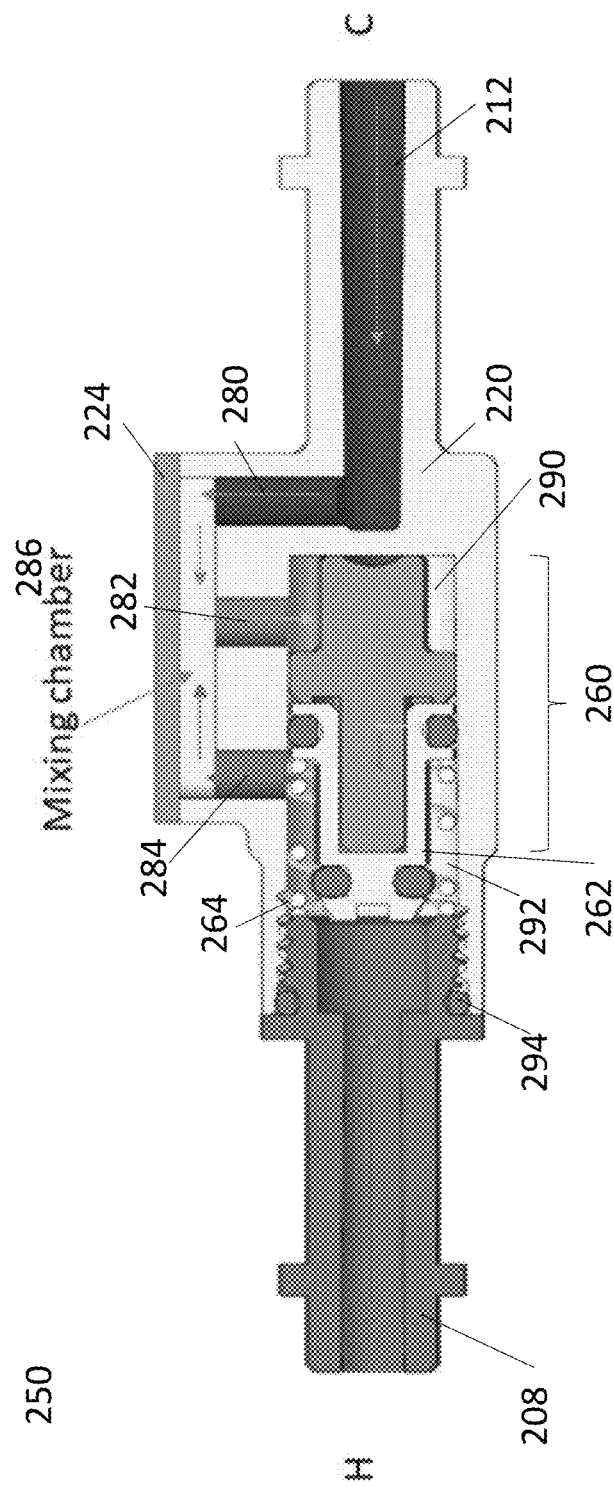
FIG. 2C shows a cross-sectional view of an anti-scald device having a wax element, according to some embodiments.

FIG. 2C shows a cross-sectional view of an anti-scald device 250 having a wax element 260, according to some embodiments. As shown, the anti-scald device 250 includes hot water inlet 208, cold water inlet 212, mixing chamber 286, waterway 284 through which hot water flows from cavity 292 to mixing chamber 286, waterway 282 through which mixed water flows from mixing chamber 286 to cavity 290, waterway 280 through which cold water flows from cold water inlet 212 to mixing chamber 286, cover plate 224 forming mixing chamber 286 (along with housing 220), wax element 260, plunger 262, and spring 264.

Anti-scald device 250 is configured to receive hot water at hot water inlet 208. The hot water enters a first cavity 292, and then flows to mixing chamber 286 through waterway 284. Anti-scald device 250 is also configured to receive cold water at cold water inlet 212. The cold water enters flows to mixing chamber 286 through waterway 280. Hot water inlet 208 may be configured to couple to a hot water supply (e.g., via a hot water supply hose) and cold water inlet may be configured to couple to a cold water supply (e.g., via a cold water supply hose).

Cold water and hot water mix in mixing chamber 286 to form mixed water. The mixed water flows through waterway 282 into the second cavity 290, where the mixed water comes in contact with wax element 260. From second cavity 290, the mixed water flows to an outlet (e.g., outlet 222 of FIG. 2A). The outlet may be coupled to a faucet body, such that the mixed water can flow from anti-scald device 250, to a faucet body of a faucet assembly, and out of the faucet body to a user.

Housing 220 comprises a first cavity 292 and a second cavity 290. First cavity 292 is configured to house spring 264, and second cavity 290 is configured to house at least a head portion of wax element 260. Each cavity (i.e., first cavity 292 and second cavity 290) is defined by interior walls of housing 220, plunger 262, and/or wax element 260. Further, each cavity (i.e., first cavity 292 and second cavity 290) is configured to have a variable volume, depending on the activation status of anti-scald device 250. For example, when in an "open" or "inactive" position, wax element is in a fully contracted, resting position, such that the hot water inlet flow is entirely unrestricted. In this open position or inactive configuration, second cavity 290 is at its minimum volume, and first cavity 292 is at its maximum volume. However, when anti-scald device 250 is activated, wax element 260 expands to push the plunger 262 towards spring 264 and hot water inlet 208, reducing the volume of first cavity 292 and increasing the volume of second cavity 290. As shown, spring 264 and wax element 260 are located on opposing sides of plunger 262. Specifically, spring 264 and wax element 290 are located on opposing sides of a circumferential protrusion 298 or head portion of plunger 262. Further, when anti-scald device 250 moves between an open (inactive) and a closed (active) position (i.e., when wax element 260 first expands and then returns to its original position in response to a mixed water temperature), the outer surface of the circumferential protrusion portion 298 of plunger 262 and the outer surface of the circumferential protrusion portion 252 of wax element 260 slides against the inner surface of housing 220. When the anti-scald device 250 is in a closed position (i.e., hot water flow is completely restricted), the outer surface of the circumferential protrusion portion 298 of plunger 262 may cover the opening to waterway 284, preventing hot water from flowing to mixing chamber 286. In some embodiments, the outer surface of the circumferential protrusion portion 298 creates a watertight seal with the inner surface of housing 220. In some embodiments, spring 264 surrounds a shaft portion of plunger 262. In some embodiments, the outer surface of the circumferential protrusion portion 252 of plunger 260 may cover the opening to waterway 284, preventing hot water from flowing to mixing chamber 286. In some embodiments, the outer surface of the circumferential protrusion portion 252 creates a watertight seal with the inner surface of housing 220.

As just explained, wax element 260 and/or plunger 262 divides the internal cavity of housing into two separate cavities, cavity 292 and cavity 290. Cavity 292 houses spring 264, and is configured to receive hot water from hot water inlet 208. From cavity 292, the hot water then travels to mixing chamber 286 by way of waterway 284. On the other hand, cavity 290 is located on an opposite side of the plunger 262 and head portion of wax element 260. Cavity 290 is configured to receive mixed water from mixing chamber 286 by way of waterway 282. When in cavity 290, the mixed water comes in direct contact with wax element 260.

Once the hot water flow is partially or completely restricted due to the expansion of the wax element 260, cold water (only or predominately) flows into the anti-scald device 250 and into mixing chamber 286. This causes the temperature of the mixed water to decrease below the threshold temperature. When the temperature of the mixed water drops below the threshold temperature, the wax element 260 contracts or returns to its original size and shape. In some embodiments, the compressed spring 264 helps push the wax element 260 back into its original position, up against a side wall of the internal cavity of housing 220.

Additionally, when wax element 260 returns to its original size, shape, and position, the plunger 262 also returns to its original position, reopening the hot water inlet 208 and allowing hot water to flow form hot water inlet 208 to cavity 292 unrestricted once again.

The threshold temperature is the temperature at which wax element 260 expands to push plunger 262 towards hot water inlet 208 to reduce or completely restrict water flow from hot water inlet 208 to cavity 292 and mixing chamber 286. In some embodiments, the threshold temperature is about 100-180 or about 115-125° F. In some embodiments, the threshold temperature may be less than or equal to about 180, about 170, about 160, about 150, about 140, about 130, about 120, or about 110° F. In some embodiments, the threshold temperature may be greater than or equal to about 100, about 110, about 120, about 130, about 140, about 150, about 160, or about 170° F. The threshold temperature may be higher for circumstances in which warmer water is needed and/or the typical user of the faucet assembly is tolerant of hotter water. The threshold temperature may be lower for circumstances in which slightly cooler water is needed and/or the typical user of the faucet assembly is less tolerant of hotter water. In some embodiments, the threshold temperature may be determined by a user. In some embodiments, the threshold temperature may be predetermined by the manufacturer. In some embodiments, the threshold temperature may depend on the material and/or size of wax element 260.

As shown in FIG. 2C, hot water inlet 208 may be formed by an adaptor piece that is separate from housing 220. However, in some embodiments, hot water inlet 208 may be formed by housing 220, without the use of a second adaptor piece. The adapter may not be formed integrally with housing 220, but may instead be formed separately and then coupled to housing 220. In some embodiments, the adaptor may comprise a male connector portion that is configured to couple to a female portion of housing 220. In some embodiments, the connector portion of the adaptor is configured to couple to a connector portion of housing 220 with a threaded coupling. The coupling between housing 220 and the adaptor may include an o-ring 294 to help ensure a tight seal. In some embodiments, the seal formed between the adaptor and housing 220 may be watertight.

In some embodiments, the interior space of mixing chamber 286 may be defined only by housing 220. In some embodiments, the interior space of mixing chamber 286 may be defined by housing 220 and a cover plate 224. In embodiments comprising a cover plate 224, the cover plate 224 may be manufactured separate from housing 220 and attached to housing 220 to form mixing chamber 286. In some embodiments, housing 220 may comprise vinyl or polyphenylene sulfide. Housing 220 may be injection molded. In some embodiments, cover plate 224 may comprise vinyl or polyphenylene sulfide. In some embodiments, cover plate 224 may be injection molded or extruded.

In some embodiments, the flow path of an outlet of anti-scald device 250 is perpendicular to a direction of lateral movement of plunger 262. In some embodiments, the flow path of an outlet of anti-scald device 250 is perpendicular to the flow paths of waterways 284, 282, and 280. In some embodiments, the flow paths of waterways 284, 282, and 280 are perpendicular to a direction of lateral movement of plunger 262. In some embodiments, the flow path of an outlet of anti-scald device 250 is un-aligned with the flow paths of waterways 284, 282, and 280 (e.g., not perpendicular or parallel).

Figure 2D:
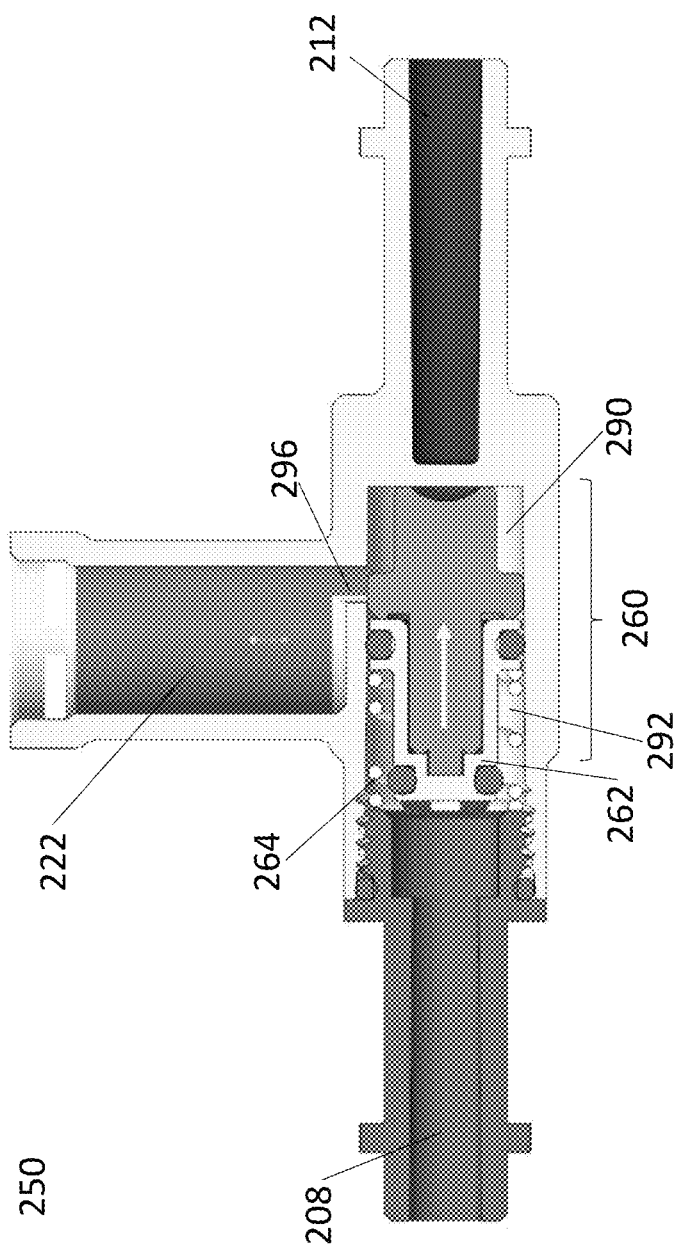
FIG. 2D shows a cross-sectional view of an anti-scald device having a wax element, according to some embodiments.

FIG. 2D shows a cross-sectional view of an anti-scald device 250 having a wax element 260, according to some embodiments. Specifically, FIG. 2D shows a cross-sectional view of an anti-scald device 250 at a different angle from that which is shown in FIG. 2C, such that outlet 222 and waterway 296 are shown here. Mixed water flows from second cavity 290 to outlet 222 through waterway 296.

Figure 2E:
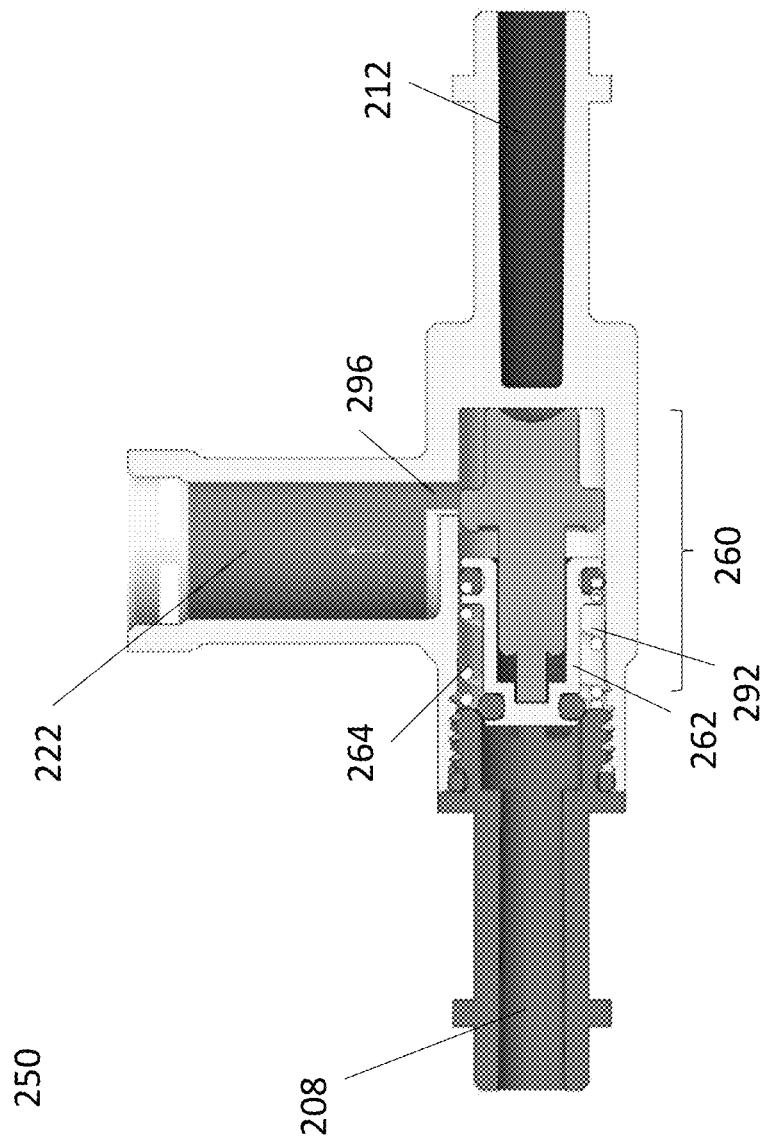
FIG. 2E shows a cross-sectional view of an anti-scald device in an activated configuration, according to some embodiments.

FIG. 2E shows an anti-scald device 250 in a closed, or activated position. As shown, the distal end of the shaft portion of plunger 260 is in contact with an interior surface of hot water inlet 208. The contact between the distal end of plunger 260 and the interior surface of hot water inlet 208 prevents water from entering cavity 292 from hot water inlet 208.

The foregoing description sets forth exemplary systems, methods, techniques, parameters, and the like. It should be recognized, however, that such description is not intended as a limitation on the scope of the present disclosure but is instead provided as a description of exemplary embodiments.

Although the description herein uses terms first, second, etc. to describe various elements, these elements should not be limited by the terms. These terms are only used to distinguish one element from another.

The invention claimed is:

1. An anti-scald device for a faucet assembly, the anti-scald device comprising:
   a housing having a cylindrical interior space comprising a first cavity, a second cavity, a mixing chamber, a hot water inlet, and a cold water inlet;
   a plunger provided within the cylindrical interior space of the housing and comprising a shaft portion and a cylindrical protrusion portion, wherein an outer cylindrical surface of the cylindrical protrusion portion is in contact with an interior surface of the housing, and the cylindrical protrusion portion separates the first cavity from the second cavity of the housing;
   a spring provided within the first cavity and coiled around the shaft portion of the plunger; and
   a wax element provided within the second cavity,
   wherein the mixing chamber is configured to receive hot water from the hot water inlet and cold water from the cold water inlet to form mixed water, and the second cavity is configured to receive the mixed water from the mixing chamber, and
   wherein the anti-scald device is in an inactive configuration when the temperature of the mixed water is below a threshold temperature, and when the mixed water reaches or exceeds a threshold temperature and comes in contact with the wax element, the wax element is configured to expand, causing the plunger to move laterally within the housing to compress the spring and reduce or restrict hot water flow into the mixing chamber such that the anti-scald is in a partially active or a fully active configuration.

2. The anti-scald device of claim 1, wherein the wax element comprises paraffin wax.

3. The anti-scald device of claim 1, wherein the threshold temperature is 115-125° F.

4. The anti-scald device of claim 1, wherein, when the anti-scald device is in the inactive configuration, the wax element is fully contracted and the spring is fully expanded.

5. The anti-scald device of claim 1, wherein the shaft portion of the plunger comprises a proximal end adjacent to the cylindrical protrusion portion and a distal end, and when the anti-scald device transitions from the inactive configuration to the fully active configuration, the plunger moves laterally such that an outer surface of the distal end of the shaft portion of the plunger comes in contact with an interior surface of the hot water inlet, preventing flow of hot water through the hot water inlet and into the first cavity.

6. The anti-scald device of claim 1, wherein, when the anti-scald device is in the fully active configuration, an outer surface of the cylindrical circumferential portion of the plunger covers an opening of a waterway fluidly connecting the hot water inlet and the mixing chamber, preventing flow of hot water through the opening.

7. The anti-scald device of claim 1, wherein, when the anti-scald device is in the fully active configuration, an outer surface of a distal end of the shaft portion of the plunger closes the hot water inlet, preventing flow of hot water through the hot water inlet and into the first cavity.

8. The anti-scald device of claim 1, wherein the anti-scald device comprises an outlet configured to receive mixed water from the second cavity, wherein a flow path of the outlet is perpendicular to a direction of lateral movement of the plunger.

9. The anti-scald device of claim 1, wherein the mixing chamber is formed by the housing and a cover plate.

10. The anti-scald device of claim 1, wherein the hot water inlet comprises an adaptor coupled to the housing.

11. A faucet assembly comprising an anti-scald device, the faucet assembly comprising:
- a faucet body;
- two handle members, a first handle member configured to control flow of hot water from a hot water source to the faucet body and a second handle member configured to control flow of cold water from a cold water source to the faucet body; and
- an anti-scald device fluidly coupled to each of the two handle members and the faucet body, the anti-scald device comprising:
  - a housing having a cylindrical interior space comprising a first cavity, a second cavity, a mixing chamber, a hot water inlet in fluid communication with the first handle member, and a cold water inlet in fluid communication with the second handle member;
  - a plunger provided within the cylindrical interior space of the housing and comprising a shaft portion and a cylindrical protrusion portion, wherein an outer cylindrical surface of the cylindrical protrusion portion is in contact with an interior surface of the housing, and the cylindrical protrusion portion separates the first cavity from the second cavity of the housing;
  - a spring provided within the first cavity and coiled around the shaft portion of the plunger; and
  - a wax element provided within the second cavity,
  - wherein the mixing chamber is configured to receive hot water from the hot water inlet and cold water from the cold water inlet to form mixed water, and the second cavity is configured to receive the mixed water from the mixing chamber, and
  - wherein the anti-scald device is in an inactive configuration when the temperature of the mixed water is below a threshold temperature, and when the mixed water reaches or exceeds a threshold temperature and comes in contact with the wax element, the wax element is configured to expand, causing the plunger to move laterally within the housing to compress the spring and reduce or restrict hot water flow into the mixing chamber such that the anti-scald is in a partially active or a fully active configuration.

12. The faucet assembly of claim 11, wherein the wax element comprises paraffin wax.

13. The faucet assembly of claim 11, wherein the threshold temperature is 115-125° F.

14. The faucet assembly of claim 11, wherein, when the anti-scald device is in the inactive configuration, the wax element is fully contracted and the spring is fully expanded.

15. The faucet assembly of claim 11, wherein the shaft portion of the plunger comprises a proximal end adjacent to the cylindrical protrusion portion and a distal end, and when the anti-scald device transitions from the inactive configuration to the fully active configuration, the plunger moves laterally such that an outer surface of the distal end of the shaft portion of the plunger comes in contact with an interior surface of the hot water inlet preventing flow of hot water through the hot water inlet and into the first cavity.

16. The faucet assembly of claim 11, wherein, when the anti-scald device is in the fully active configuration, an outer surface of the cylindrical circumferential portion of the plunger covers an opening of a waterway fluidly connecting the hot water inlet and the mixing chamber, preventing flow of hot water through the opening.

17. The faucet assembly of claim 11, wherein, when the anti-scald device transitions from the fully active configuration to the inactive configuration due to the temperature of the mixed water decreasing below the threshold temperature, the spring returns to its expanded configuration.

18. The faucet assembly of claim 11, wherein the anti-scald device comprises an outlet configured to receive mixed water from the second cavity, wherein a flow path of the outlet is perpendicular to a direction of lateral movement of the plunger.

19. The faucet assembly of claim 11, wherein the mixing chamber is formed by the housing and a cover plate.

20. The faucet assembly of claim 11, wherein the hot water inlet comprises an adaptor coupled to the housing.

* * * * *